Jan. 27, 1953          S. C. CARNEY          2,626,889
METHOD OF AND APPARATUS FOR LIQUID-LIQUID CONTACTING
Filed Nov. 22, 1948
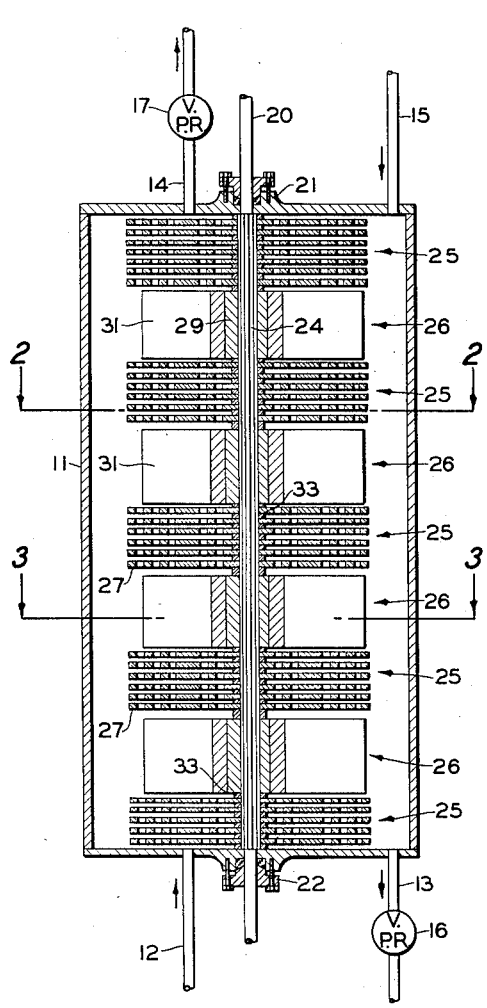
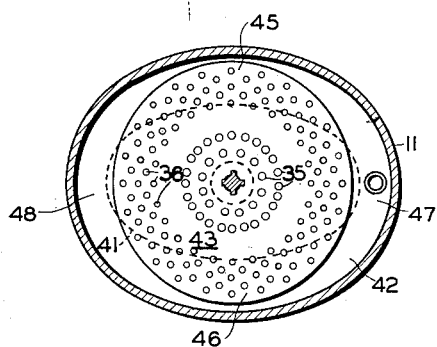
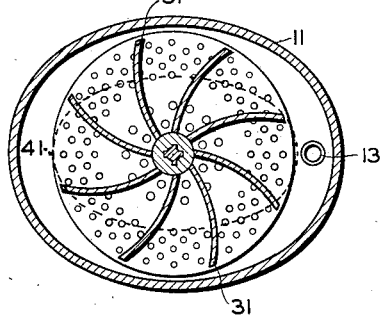
*INVENTOR.*
S. C. CARNEY
BY Hudson & Young
*ATTORNEYS*

Patented Jan. 27, 1953

2,626,889

UNITED STATES PATENT OFFICE 2,626,889

METHOD OF AND APPARATUS FOR LIQUID-LIQUID CONTACTING

Samuel C. Carney, Bartlesville, Okla., assignor to Phillips Petroleum Company, a corporation of Delaware Application November 22, 1948, Serial No. 61,441

3 Claims. (Cl. 196—14.49)

This invention relates to a method of liquid-liquid contacting and to apparatus for carrying out said method.

There are numerous operations in which two liquid phases are brought into intimate contact for the purpose of purification, separation or reaction. In one type of operation, known as liquid-liquid extraction, two liquid phases are brought into contact for the purpose of separating or extracting one or more of the components of one of the liquids by contact with a second liquid, generally known as the solvent. Such liquid-liquid extraction processes are frequently used for separating various hydrocarbon mixtures, such as close boiling paraffins and naphthenes, which cannot be separated by fractionation. Two liquid phases are also brought into intimate contact in various treating operations in which some impurity, such as hydrogen sulfide, mercaptans or a small amount of an aluminum halide catalyst, is removed from a hydrocarbon mixture. A similar type of operation is also used in various catalytic hydrocarbon conversion processes, such as alkylation, in which the liquid phase hydrocarbon reactants are brought into intimate contact with a liquid phase catalyst so as to produce a reaction.

Liquid-liquid extraction is presently carried out in various types of mechanical mixers, packed columns, and spray towers. Countercurrent contact is obtained in the packed columns and spray towers by dispersing one of the liquids and allowing it to pass through a second liquid known as the continuous phase. If the feed liquid mixture is the dispersed phase and the solvent the continuous phase, the transfer of one or more components of the feed mixture to the solvent is accomplished at the interfacial contact between the two liquids, the greater the interfacial contact, the higher the rate of transfer. In spray towers, the transfer between the two phases is accomplished through the interfacial area of the dispersed drops, but the components within the drops must diffuse to the surface before transfer can be made. Furthermore, the portion of the continuous phase adjacent the interface soon becomes saturated or reaches equilibrium with respect to the components which are being extracted and, unless new solvent is continually brought into the area adjacent the interface, it is necessary to rely on diffusion through the solvent. As a result, several feet of tower height are required to obtain an equilibrium extraction stage.

The apparatus of the present invention provides a means for overcoming these difficulties so that several equilibrium extraction stages may be provided within a relatively short contacting zone.

It is an object of this invention to provide a method and apparatus whereby intimate contact may be obtained between the two phases while still permitting countercurrent operation.

It is a further object of the invention to permit contacting of the phases by controlled, guided, and measurable means while simultaneously separating the phases by centrifugal force in order to allow countercurrent operation.

It is a still further object of the invention to provide an interface between two continuous phases such that there is a rapid periodic increase and decrease in interfacial surface per unit volume.

It is a still further object to provide a contacting method and apparatus wherein inertia forces result in the two phases having different angular velocities at all points in the interface, thus placing the interface continuously in shear.

It is a still further object to provide apparatus in which several extraction stages may be disposed within a relatively short contacting zone.

It is a still further object of the invention to provide apparatus which is of rugged construction, reliable in operation and has a minimum of moving parts.

Various other objects, advantages and features of the invention will become apparent from the following detailed description taken in conjunction with the accompanying drawings, in which:

Figure 1 is a vertical sectional view of the contacting apparatus of this invention; and Figures 2 and 3 are sectional views taken, respectively, along the lines 2—2 and 3—3 of Figure 1.

Referring now to the drawings in detail, and particularly to Figure 1, the apparatus comprises an elongated vessel 11 of generally elliptical cross section. The cross section of the vessel may depart much or little from the circular although it is desirable, in most cases, to provide a considerable departure from the circular configuration. An inlet 12 for light liquid and an outlet 13 for heavy liquid communicate with the bottom of the vessel, the inlet 12 being located adjacent the central region of the vessel, and the outlet 13 being disposed at the peripheral region of the vessel. An outlet 14 for light liquid and an inlet 15 for heavy liquid communicate with the top of the vessel 11, the outlet 14 being disposed at the central region of the vessel, and the inlet 15 being located at the peripheral region of the vessel.

The outlets 13 and 14 are provided, respectively, with valves 16 and 17 for regulating back pressure.

A shaft 20 is journalled in the vessel 11 in bearings 21 and 22, this shaft preferably extending through the center of the vessel in a vertical direction. The shaft 20 has a splined portion 24 within the vessel 11 and this splined portion carries a series of disc sets 25 and impeller units 26 which are disposed alternately throughout the length of the splined portion 24. Each of the impeller units 26 includes a hub 29 which is engageable with the splined portion 24 of the shaft, and a series of arcuate blades 31 which are of the proper configuration to establish centrifugal movement of the liquids within the vessel 11.

Each of the disc sets 25 includes a plurality of closely spaced discs 27 which have openings formed therein which are complementary with the splined portion of the shaft. A spacer 33 is disposed between each pair of discs for maintaining the discs of each set in proper spaced relation. Each of the discs 27 has a number of relatively large openings 35 formed in the central region thereof to allow liquid to flow axially of the vessel, and a number of relatively small openings 36 formed in the peripheral region thereof. The openings 36 are sufficiently small that they function to entrain a droplet of liquid therein as the discs rotate through the liquid in the vessel 11. If desired, small openings may also be formed at the ends of the impeller blades 31, said openings being of approximately the same size as the openings 36. In some cases, the impeller units 26 may be omitted and the entire length of the shaft may be occupied by a series of closely spaced discs 27 which are perforated in the manner already described.

The operation of the contacting apparatus will now be apparent to those skilled in the art. Assuming that the vessel 11 is filled with a mixture of light and heavy liquids and that shaft 20 is rotated at a suitable speed by any power source, not shown, the rotating discs and impellers cause the heavy liquid to move outwardly toward the periphery of the vessel while the light liquid is forced inwardly toward the central region of the vessel. As a result, a neutral zone or interface is formed between two continuous phases or bodies composed, respectively, of the light liquid and the heavy liquid. This interface is of generally elliptical cross section due to the elliptical shape of the vessel 11. As an example, referring to Figure 2, the elliptical interface may have the cross section indicated by dotted line 41, in which case the volume 42 between the interface and the outer wall of the vessel consists of a continuous body or phase of heavy liquid while the volume 43 bounded by the interface consists of a continuous body or phase of light liquid.

With the shaft rotating in the manner stated, heavy liquid is admitted through inlet 15 and passes through the vessel in a longitudinal direction to outlet 13, the back pressure at which is regulated by valve 16. Light liquid is admitted at inlet 12 and flows upwardly through the disc openings 35 and impellers 26, in countercurrent flow with respect to the heavy liquid, to outlet 14, the back pressure at which is regulated by valve 17. The location of the interface 41 may be varied by controlling the pressure differential between outlet 13 and outlet 14. Thus, if the back pressure at outlet 13 is high as compared with the back pressure at outlet 14, the ratio of heavy liquid to light liquid within the vessel increases and the interfacial zone is constricted so that its cross section becomes an ellipse smaller than that defined by dotted line 41. In contrast, if the back pressure at outlet 14 is high as compared to the back pressure at outlet 13, the ratio of light liquid to heavy liquid increases, and the interface is expanded so that its cross section is defined by an ellipse of larger size than that represented by dotted line 41.

Due to the elliptical shape of the housing and interface, it will be apparent that a unit volume of heavy liquid has a greater surface of interface at the regions 45, 46 of the vessel and a smaller surface of interface at the regions 47, 48 of the vessel. The converse is true of a unit volume of the light liquid. Thus, with respect to each liquid, as the interfacial surface of unit volume increases, molecules move from the body of liquid to the interface and, as the interfacial surface of unit volume decreases, molecules move from the surface to points within the body. This is the equivalent, in liquids handling, of kneading of plastic bodies. Each liquid is, thus, kneaded by contact with the other. Since the centrifugally effective radius at the interface location is also variable, the inertia forces result in the two liquids having different angular velocities at all points in the interface, thus placing the interface continually in shear. This is especially true in that part of the apparatus where the interface is cut by the flat discs. For, at the regions 45 and 46 in the sections cut by impeller blades, angular velocity is governed positively with a minimum of inertia effect to cause one liquid to move ahead of the other liquid. This results in lamellar flow of the two liquids. Thus, the liquid stream, while guided by the smooth housing surface on one side and by centrifugal force on the other, with random turbulence at a minimum, has the depth of both liquids rapidly increased and diminished, thereby forcing lamellae of each liquid to slip over the other to provide such changes in radial depth.

In accordance with the invention, at the regions 47, 48 of the vessel, a large part of the surfaces of discs 27 and impellers 26 is wetted by the heavy liquid, while at the regions 45, 46 these surfaces are wetted by the light liquid. Accordingly, in effect, these surfaces are wetted by one liquid and then plunged into the other liquid twice during each revolution of the shaft. Alternatively, it may be considered that the interface reciprocates over the alternately wetted portions of the impellers and discs twice during each revolution of the shaft. It will be apparent that liquid entrained in the perforations 36 of the disc is thereby subjected to shearing contact with the continuous bodies or phases of heavy and light liquids in the vessel. For example, referring to Figure 2, the openings 36 at region 48 are filled with light liquid which is subjected to shearing contact by heavy liquid as said openings move into region 45. Thereupon, the openings are filled with heavy liquid in the region 45 and these entrained droplets of heavy liquid are subjected to shearing contact with the light liquid as the openings move into the region 47. In this manner, the openings 36 are alternately filled with droplets of the light and heavy liquid which are immediately subjected to shearing contact with the continuous body or phase of the other liquid.

It will be apparent that the contacting action obtained through the wetting of the discs and impellers by liquid films, and through the entrainment of liquid within the openings 36, tends to disperse films or droplets of one liquid into the continuous body or phase of the other liquid. This tendency toward dispersion is counteracted by the centrifugal force of the impellers and discs which tend to maintain the interface 41 between the two continuous phases. In this manner, countercurrent flow of the liquids to be contacted is readily obtained while emulsification thereof is prevented by the centrifugal action. As a result, the phases are separated and countercurrent flow is obtained by the use of strong centrifugal force while, at the same time, the two phases are efficiently contacted by controlled, guided, and measurable means, as distinguished from the random forces of turbulence.

As a specific example, a relatively heavy liquid, such as furfural, is introduced to the periphery of the contacting vessel through inlet 15 and passes downwardly in countercurrent contact with a relatively lighter liquid, such as a hydrocarbon mixture, introduced to the central area of the vessel through inlet 12. As these two liquids pass countercurrently through the vessel, they are caused to rotate within the elliptical cross section of the vessel by the impellers 26 and disc sets 25 so as to cause the heavy liquid to form an outer liquid phase and the lighter liquid an inner liquid phase. Both liquid phases are repeatedly cut by the revolving discs which are coated with a thin film of liquid and also entrain small droplets of liquid within the holes in the discs. The liquid film on the discs and the drops of liquid retained in the holes in the discs pass and are transported through the interface separating the two liquid phases and may become dispersed in the second liquid unless one liquid preferentially wets the discs. If this condition exists, the liquid which preferentially wets the discs will be passed into contact with the second liquid in the form of thin liquid film having very substantial surface area relative to volume, and thus providing a large interfacial area for transfer of constituents to or from the second liquid. If neither liquid preferentially wets the discs, each liquid becomes dispersed in the other and is almost simultaneously separated again due to centrifugal action. Heavy liquid dispersed in the light liquid phase will immediately return to the heavy liquid continuous phase, and light liquid dispersed in the heavy liquid will likewise immediately return to the continuous light liquid phase. From the above discussion, it is apparent that the apparatus of this invention provides a means for substantially increasing the interfacial area of contact between the two liquid phases, and also a means for eliminating the difficulties presently encountered in other liquid-liquid extraction devices due to the necessity of relying on diffusion for the transfer of components of a liquid phase to the interface.

The apparatus of this invention has been described hereinabove with the relatively heavy liquid admitted at the top of the vessel, and the lighter liquid admitted at the bottom thus establishing countercurrent flow. However, in this apparatus, countercurrent flow may also be obtained when the heavy liquid is admitted at the bottom of the vessel through line 13 and withdrawn at the top through line 15 with the lighter liquid being admitted through line 14 and withdrawn through line 12. It is still possible to obtain general countercurrent flow under these conditions because the centrifugal action within the contacting vessel causes the two liquids to be maintained in two separate and distinct liquid phases, and thus the heavy liquid may be caused to pass upwardly as the outer heavy liquid phase countercurent to the downwardly moving inner lighter liquid phase. This type of operation will usually require the expenditure of more power to provide the necessary centrifugal force within the contacting zone. However, in certain applications, this operation will be found to be advantageous because of the increased internal recycle within the contacting zone. This recycle will result from droplets of light liquid dispersed in the heavy liquid phase moving concurrently with the heavy liquid phase for the short period of time, during which separation is taking place so as to return the dispersed light liquid back to the continuous light liquid phase at a somewhat higher level in the vesel than that at which dispersion occured. Obviously, the same effect will be noted with the heavy liquid droplets dispersed in the downwardly moving lighter liquid phase.

While the invention has been described in connection with a present, preferred embodiment thereof, it is to be understood that this description is illustrative only and is not intended to limit the invention, the scope of which is defined by the appended claims.

Having described my invention, I claim:

1. In the art of liquid-liquid contacting, the steps which comprise effecting countercurrent flow of a heavy liquid and a light liquid through a mixing zone, centrifuging the liquid in the mixing zone to establish an interface between phases of heavy and light liquids, continuously transporting droplets of light liquid from a region within the light liquid phase through the interface into the heavy liquid phase, and continuously transporting droplets of heavy liquid from a region within the heavy liquid phase through the interface into the light liquid phase.

2. In the art of liquid-liquid contacting, the steps which comprise effecting countercurrent flow of a heavy liquid and a light liquid through an elongated mixing zone of generally elliptical cross section, centrifuging the liquid in the mixing zone to establish an interface of generally elliptical cross section between phases of heavy and light liquids whereby the interfacial surface per unit volume continuously changes as the liquid passes in an elliptical path around the mixing zone, and whereby the liquids are subjected to shearing contact at the interface, continuously transporting droplets of light liquid from a region within the light liquid phase through the interface into the heavy liquid phase, and continuously transporting droplets of heavy liquid from a region within the heavy liquid phase through the interface into the light liquid phase.

3. In the art of liquid-liquid contacting, the steps which comprise effecting countercurrent flow of a heavy liquid and a light liquid through an elongated mixing zone of generally elliptical cross section, centrifuging the liquid in the mixing zone to establish an interface of generally elliptical cross section between bodies of heavy and light liquids, passing a perforated surface in a circular path through the mixing zone whereby droplets of light liquid are entrained in the perforations as the surface passes through the body of light liquid, said droplets thereafter passing through the interfaces into the body of heavy liquid, and droplets of heavy liquid are entrained within said perforations as said surface passes through the body of heavy liquid, said droplets of heavy liquid thereafter passing through the interfaces into the body of light liquid.

4. In the art of liquid-liquid contacting, the steps which comprise effecting countercurrent flow of a heavy liquid and a light liquid through an elongated mixing zone of generally elliptical cross section, centrifuging the liquid in the mixing zone to establish an interface of generally elliptical cross section between bodies of heavy and light liquids, passing a perforated surface in a circular path through the mixing zone whereby droplets of light liquid are enrained in the perforations as the surface passes through the body of light liquid, said droplets thereafter passing through the interface into the body of heavy liquid, and droplets of heavy liquid are entrained within said perforations as said surface passes through the body of heavy liquid, said droplets of heavy liquid thereafter passing through the interface into the body of light liquid, said droplets of light and heavy liquids being subjected to shearing contact as they pass through the interface into the continuous body of the other phase.

5. In apparatus for liquid-liquid contacting, in combination, an elongated vessel of generally elliptical cross section, a shaft journalled in said vessel and extending longitudinally therethrough, a plurality of sets of discs carried by said shaft and rotatable therewith, each set including a series of discs closely spaced to each other, each disc having relatively large openings formed in the central region thereof for permitting axial flow of liquid therethrough, and a large number of relatively small openings in the peripheral regions thereof adapted for entrainment of the liquid to be contacted within said vessel, an inlet conduit for heavy fluid and an outlet conduit for light fluid at one end of said vessel, and an inlet for light fluid and an outlet for heavy fluid at the other end of said vessel.

6. In apparatus for liquid-liquid contacting, in combination, an elongated vessel of generally elliptical cross section, a shaft journalled in said vessel and extending longitudinally therethrough, a plurality of sets of discs carried by said shaft and rotatable therewith, each set including a series of discs closely spaced to each other, each disc having relatively large openings formed in the central region thereof for permitting axial flow of liquid therethrough, and a large number of relatively small openings in the peripheral regions thereof adapted for entrainment of the liquid to be contacted within said vessel, an outlet for heavy fluid at the top of said vessel and communicating with the peripheral region thereof, a valve for regulating the back pressure at said outlet, a line for feeding light fluid into the top of said vessel at the central region thereof, an outlet for light fluid at the bottom of said vessel communicating with the central region thereof, a valve for regulating the back pressure at said light fluid outlet, and an inlet for heavy fluid at the bottom of said vessel communicating with the peripheral region thereof.

7. In apparatus for liquid-liquid contacting, in combination, an elongated vessel of generally elliptical cross section, a shaft journalled in said vessel and extending longitudinally therethrough, a series of disc sets and impeller units mounted alternately along said shaft and rotatable therewith, each impeller unit consisting of an unshrouded centrifugal pump impeller, and each disc set including a series of discs in closely spaced arrangement along said shaft, each disc having a plurality of relatively large openings in the central region thereof to permit passage of liquid therethrough in an axial direction, and a large number of relatively small openings in the peripheral region thereof in which droplets of liquid within said vessel may be entrained, an inlet for light fluid and an outlet for heavy fluid at one end of said vessel, and an inlet for heavy fluid and an outlet for light fluid at the other end of said vessel.

8. In apparatus for liquid-liquid contacting, in combination, an elongated vessel of generally elliptical cross section, a longitudinal shaft journalled within said vessel having a splined portion extending longitudinally through said vessel, a series of impellers and disc sets mounted alternately along said shaft within said vessel, each impeller including a sleeve keyed to the splined portion of the shaft and an unshrouded centrifugal pump impeller carried by said sleeve and rotatable therewith, each disc set including a plurality of thin metal discs having central openings keyed to the splined portion of the shaft, and spacers between said discs for maintaining them in closely spaced relation, each disc having a plurality of relatively large openings in the central region thereof to permit passage of liquid therethrough in an axial direction, and a large number of relatively small openings in the peripheral region thereof for entrainment of droplets of liquid, an outlet for heavy fluid at the top of said vessel and communicating with the peripheral region thereof, a valve for regulating the back pressure at said outlet, a line for feeding light fluid into the top of said vessel at the central region thereof, an outlet for light liquid at the bottom of said vessel communicating with the central region thereof, a valve for regulating the back pressure at said light fluid outlet, and an inlet for heavy fluid at the bottom of said vessel communicating with the peripheral region thereof.

SAMUEL C. CARNEY.

REFERENCES CITED

The following references are of record in the file of this patent:

UNITED STATES PATENTS

| Number | Name | Date |
| --- | --- | --- |
| 2,029,688 | Wilson | Feb. 4, 1936 |
| 2,093,645 | Podbielniak | Sept. 21, 1937 |
| 2,176,983 | Thayer | Oct. 24, 1939 |
| 2,248,620 | Freedman et al. | July 8, 1941 |
| 2,234,921 | Webb | Mar. 11, 1944 |
| 2,361,503 | Schutte et al. | Oct. 31, 1944 |